(12) United States Patent
Zachariassen et al.

(10) Patent No.: US 9,692,825 B2
(45) Date of Patent: Jun. 27, 2017

(54) ENDPOINT CACHING FOR DATA STORAGE SYSTEMS

(75) Inventors: Rayan Zachariassen, Toronto (CA);
 Steven Lamb, Toronto (CA);
 Laryn-Joe Fernandes, Ajax (CA)

(73) Assignee: Intel Corporation, Santa Clara, CA (US)

( * ) Notice: Subject to any disclaimer, the term of this patent is extended or adjusted under 35 U.S.C. 154(b) by 370 days.

(21) Appl. No.: 13/885,545

(22) PCT Filed: Nov. 15, 2011

(86) PCT No.: PCT/CA2011/050708
 § 371 (c)(1),
 (2), (4) Date: Aug. 1, 2013

(87) PCT Pub. No.: WO2012/065265
 PCT Pub. Date: May 24, 2012

(65) Prior Publication Data
 US 2013/0304842 A1 Nov. 14, 2013

Related U.S. Application Data

(60) Provisional application No. 61/414,191, filed on Nov. 16, 2010.

(51) Int. Cl.
 *H04L 29/08* (2006.01)
 *G06F 17/30* (2006.01)

(52) U.S. Cl.
 CPC .... *H04L 67/1097* (2013.01); *G06F 17/30132* (2013.01)

(58) Field of Classification Search
 CPC ............. G06F 12/0815; G06F 12/0868; G06F 17/30067; G06F 17/30132; G06F 2212/284; G06F 2212/464; H04L 67/28
 See application file for complete search history.

(56) References Cited

U.S. PATENT DOCUMENTS 6,119,151 A * 9/2000 Cantrell ............ G06F 17/30132
 707/E17.01
7,552,223 B1 * 6/2009 Ackaouy ........... G06F 17/30067
 707/999.01
(Continued)

FOREIGN PATENT DOCUMENTS

CN   101228523    7/2008
JP   07262074     10/1995
(Continued)

OTHER PUBLICATIONS

PCT International Search Report, PCT/CA2011/050708, Jan. 19, 2012, 3 pages.
(Continued)

*Primary Examiner* — Joe Chacko
(74) *Attorney, Agent, or Firm* — Blakely, Sokoloff, Taylor & Zafman LLP

(57) ABSTRACT

A data storage system including a central storage system, at least one endpoint computer system in network communication with the central storage system by a network infrastructure, and a storage accelerator in communication with a CPU of the computer system, wherein the storage accelerator provides endpoint caching of data on the central storage system that is accessible to the at least one endpoint computer. Preferably, the storage accelerator is positioned at a location where a throughput of data from the CPU to the storage accelerator is greater than the throughput of data through a connection from the CPU to the central storage system.

12 Claims, 4 Drawing Sheets

(56) References Cited

U.S. PATENT DOCUMENTS

| | | | | | |
|---|---|---|---|---|---|
| 8,484,242 | B1* | 7/2013 | Singh | ................ | G06F 17/30442 707/770 |
| 8,543,554 | B1* | 9/2013 | Singh | ................ | G06F 17/3048 370/389 |
| 9,032,017 | B1* | 5/2015 | Singh | ................ | G06F 17/30194 709/203 |
| 2002/0116577 | A1* | 8/2002 | Hursey | ................ | G06F 12/0862 711/118 |
| 2005/0027798 | A1* | 2/2005 | Chiou | ................ | G06F 12/0813 709/203 |
| 2010/0138613 | A1* | 6/2010 | Parker | ................ | G06F 12/0862 711/133 |
| 2011/0208808 | A1* | 8/2011 | Corbett | ............. | G06F 17/30442 709/203 |
| 2012/0102138 | A1* | 4/2012 | Chan | ................ | G06F 12/0862 709/213 |
| 2014/0052848 | A1* | 2/2014 | Clothier | ................ | H04L 43/045 709/224 |
| 2014/0189862 | A1* | 7/2014 | Kruglick | ................ | G06F 21/55 726/22 |

FOREIGN PATENT DOCUMENTS

| | | |
|---|---|---|
| JP | H7-26074 | 10/1995 |
| KR | 1020050114028 | 12/2005 |
| KR | 1020040028509 | 4/2014 |
| WO | WO-2009/055174 | 4/2009 |
| WO | WO-2009/055175 | 4/2009 |
| WO | WO 2010/088437 | 8/2010 |

OTHER PUBLICATIONS

Non-Final Office Action for Korean Patent Application No. 10-2013-7015421 mailed Aug. 25, 2014, 4 pgs.
Office Action for Japanese Patent Application No. 2013-536970 mailed Jan. 28, 2014, 1 pg.
Third Office Action for Chinese Application No. 201180055207.3 mailed Jun. 24, 2016, 3 pages.
Notice to Grant (+English Translation) for Chinese Application No. 201180055207.3 mailed on Nov. 1, 2016, 4 pages.
Notice of Allowance in Korean Application No. 10-2015-7004937 mailed Sep. 11, 2015, 2 pages.
Notice of Preliminary Rejection in Korean Application No. 10-2015-7004937 mailed Jun. 15, 2015, 3 pages.
Notice of Allowance in Korean Application No. 10-2013-7015421 mailed Mar. 26, 2015, 2 pages.
Decision of Rejection (+English Translation) for Japanese Application No. 2013-536970 mailed Aug. 26, 2014, 2 pages.
Decision to Grant in Japanese Application No. 2013-536970 mailed Feb. 17, 2015, 1 page.
First Office Action and Search Report in Chinese Application No. 201180055207.3 mailed May 20, 2015, 17 pages.
Second Office Action in Chinese Application No. 201180055207.3 mailed Jan. 20, 2016, 18 pages.
International Preliminary Report for PCT Application No. PCT/CA2011/050708 mailed Mar. 22, 2013, 6 pages.

* cited by examiner

0 <= Hit Rate (HR) < 1

ENDPOINT CACHING FOR DATA STORAGE SYSTEMS

The present patent application claims priority from PCT Application No. PCT/CA2011/050708 filed Nov. 15, 2011 which is published as WO 2012/065265, currently pending, which claims priority from U.S. Provisional Application No. 61/414,191, filed Nov. 16, 2010.

FIELD OF THE INVENTION

The invention relates to the field of data storage systems and methods, and more specifically to a system and method for providing caching for data storage systems to improve the efficiency and speed of data input and output operations.

BACKGROUND OF THE INVENTION

A substantial problem in the data storage art has been how to make data storage performance keep up with the processing performance of computers to achieve efficient systems. Efficient systems in the field of data storage for computer systems generally refers to those where all major components are used in a proportional manner under normal workloads. That is, the computer system and its associated data storage device are optimally operating each at their peak capabilities. The invention, and associated background described here generally relates to persistent storage, such as disks of various kinds, and not the short term storage (usually referred to as Random Access Memory) that is embedded in computers. Currently, the limiting factor is the storage performance, as computer systems and their associated central processing units have far surpassed the speed and efficiency capabilities of these data storage systems.

Prior art solutions of how to improve data storage performance has been to make storage, and the connections between the computers and storage, faster. Examples of these include various ways of aggregating storage, such as RAID striping, improving raw performance of the storage controllers, adding caches in the storage controller as is done with most RAID controllers, in the storage appliance, or on the network server in front of the storage, and distributing the storage activity load unto multiple storage nodes.

There has also been a strong trend towards centralizing storage to ease management, as best exemplified in the emergence of SAN (Storage Area Network) and NAS (Network Attached Storage) systems for organizing and aggregating storage. The infrastructure model related to these solutions (faster and more centralized storage) can be described as a flow graph of a large number of applications running on computers connected by a network to the storage system.

In such a model it is clear that in order for the storage system performance to match the potential performance of the computers, the individual network performance (higher bandwidth and lower latency) between the computers and the storage system has to increase to enable a balance between storage system performance and computer performance.

The problem is that the potential load offered by even a very small number of computers is much higher than is practical for an economical network or central storage system to service. A computer's internal network, that is its bus, operates at one or two orders of magnitude faster speeds and higher capacities than the external networks computers generally support.

Certain prior art solutions include the use of storage accelerators attached to the storage device, such as those forming caching or tiering functions to have the network performance at a central storage meet the performance of the storage itself. Other attempted solutions to this problem have been experimented with in the context of Linux kernel facilities, with several block based implementations, for example bcache, fastcache, dmcache; and with a particular implementation intended for modified filesystems, known as FS-cache. There is also a Windows™ facility with related functionality called BranchCache, which is designed for read-only caching over wide area network links.

It is therefore an object of the invention to provide a novel system and method for improving the efficiency of data storage systems.

SUMMARY OF THE INVENTION

According to one embodiment of the invention, there is provided a data storage system including a central storage system, at least one endpoint computer system in network communication with the central storage system by a network infrastructure, and a storage accelerator in communication with a CPU of the computer system; wherein the storage accelerator provides endpoint caching of data on the central storage system that is accessible to the at least one endpoint computer.

According to one aspect of this embodiment, the storage accelerator comprises at least one software module running on the CPU controlling a physical storage unit attached to a bus of the computer system.

According to another aspect of this embodiment, the storage accelerator is positioned at a location where a throughput of data from the CPU to the storage accelerator is greater than the throughput of data through a connection from the CPU to the central storage system.

According to another aspect of this embodiment, the central storage system comprises a tiered data structure having tiers 1 to N (N>=1), and wherein the storage accelerator comprises a cache for the central storage, tier 0.

According to another aspect of this embodiment, the physical storage unit comprises a solid state memory device.

According to another aspect of this embodiment, the storage accelerator comprises a data caching structure.

According to another aspect of this embodiment, a filter driver is provided in communication with the storage accelerator.

According to another aspect of this embodiment, the software module is provided on the filter driver, and the filter driver includes instructions for determining whether a file being read or written has been marked for endpoint caching.

According to another aspect of this embodiment, the instructions for determining whether a file being read or written has been marked for endpoint caching include instructions for accessing file metadata information.

According to another aspect of this embodiment, the filter driver further includes instructions for determining if a data read operation is being requested by the computer system, and if so, determining whether data being read exists on the storage accelerator and (a) if so, fulfilling the data read operation from the storage accelerator; (b) if not, requesting the data from the central storage system and providing a copy of the data to the storage accelerator.

According to another aspect of this embodiment, the filter driver further includes instructions for determining if a data write operation is being requested by the computer system and if so, writing the data to the storage accelerator.

According to another aspect of this embodiment, the filter driver further includes instructions for writing the data to the central storage system.

According to another aspect of this embodiment, the filter driver further includes instructions for queuing the data to be written to the central storage system.

According to another aspect of this embodiment, the filter driver further includes instructions for maintaining consistency of data between the central storage system and the storage accelerator.

According to another aspect of this embodiment, the computer system comprises a mobile device.

According to another embodiment of the invention, there is disclosed a data storage method including the steps of providing a central storage system, providing at least one endpoint computer system in network communication with the central storage system by a network infrastructure, and providing a storage accelerator in communication with a CPU of the computer system; wherein the storage accelerator provides endpoint caching of data on the central storage system that is accessible to the at least one endpoint computer.

According to one aspect of this embodiment, the storage accelerator comprises at least one software module running on the CPU controlling a physical storage unit attached to a bus of the computer system.

According to another aspect of this embodiment, the storage accelerator is positioned at a location where a throughput of data from the CPU to the storage accelerator is greater than the throughput of data through a connection from the CPU to the central storage system.

According to another aspect of this embodiment, the central storage system comprises a tiered data structure having tiers 1 to N (N>=1), and wherein the storage accelerator comprises a cache for the central storage, tier 0.

According to another aspect of this embodiment, the physical storage unit comprises a solid state memory device.

According to another aspect of this embodiment, the storage accelerator comprises a data caching structure.

According to another aspect of this embodiment, the endpoint computer system is adapted to carry out data read or data write operations and the method further comprises the step of determining whether a file being read or written has been marked for endpoint caching.

According to another aspect of this embodiment, the method further includes determining whether a file being read or written has been marked for endpoint caching by accessing file metadata information.

According to another aspect of this embodiment, the method further includes determining if a data read operation is being requested by the computer system, and if so, determining whether data being read exists on the storage accelerator and (a) if so, fulfilling the data read operation from the storage accelerator; (b) if not, requesting the data from the central storage system and providing a copy of the data to the storage accelerator.

According to another aspect of this embodiment, the method further includes determining if a data write operation is being requested by the computer system and if so, writing the data to the storage accelerator.

According to another aspect of this embodiment, the method further includes writing the data to the central storage system.

According to another aspect of this embodiment, the method further includes queuing the data to be written to the central storage system.

According to another aspect of this embodiment, the method further includes maintaining consistency of data between the central storage system and the storage accelerator.

According to another aspect of this embodiment, the writing step comprises writing unbuffered data.

According to another aspect of this embodiment, the data read operation is buffered.

According to another embodiment of the invention, a data storage method includes the steps of transparently modifying the effective operating system buffering policy of data being requested by an application for read and/or write I/O operations by actively supplying data to or removing data from an operating system buffer; enabling or disabling the operating system buffer cache as required for said I/O operations; wherein said step of supplying data to the operating system buffer cache includes arranging for the application to use said data cached by the operating system.

According to another embodiment of the invention, there is provided a data storage method including the steps of caching data being requested for read and/or write operations by an application to a cache location; transparently modifying the effective buffering policy of data as requested by the application for read and write I/O operations; wherein the step of changing the effective buffering policy includes buffering at least a portion of the data being requested by the application at the cache location.

According to one aspect of this embodiment, the aforementioned cache location is an endpoint cache as herein described.

BRIEF DESCRIPTION OF THE DRAWINGS

Embodiments will now be described, by way of example only, with reference to the attached Figures, wherein.

DETAILED DESCRIPTION

Figure 1:
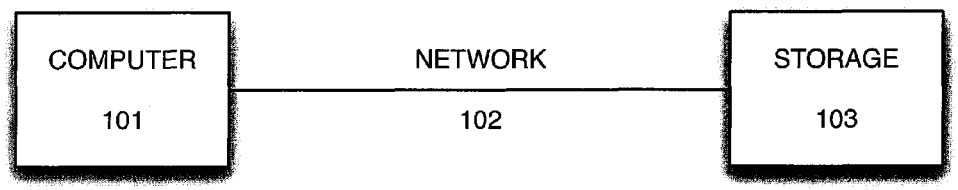
FIG. 1 shows a general prior art arrangement of a computer system accessing a central storage over a network.
Figure 7:
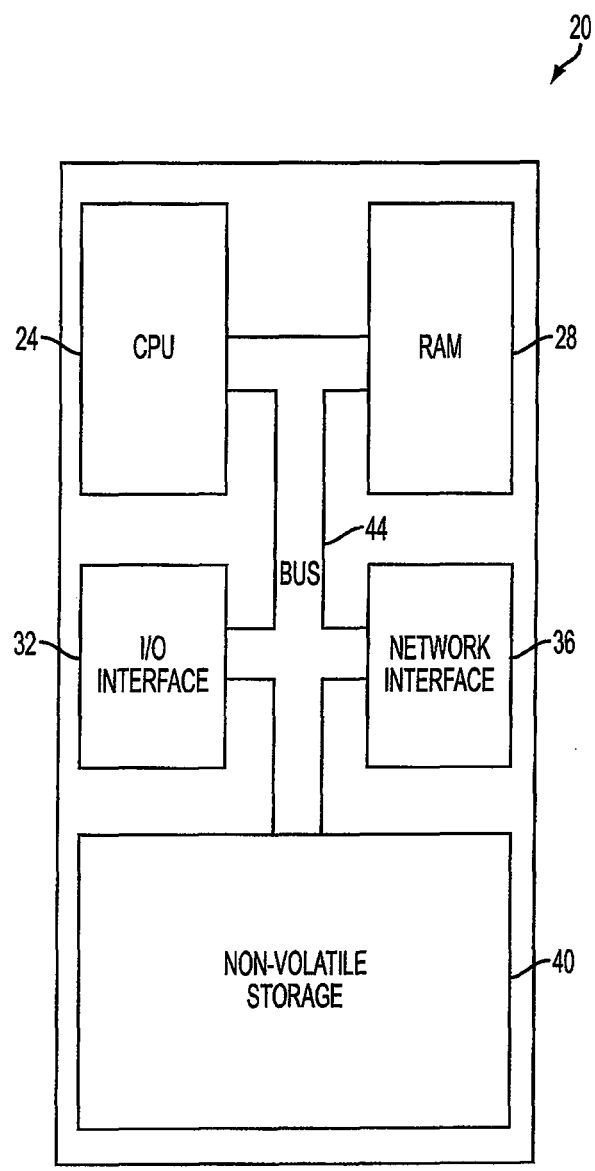
FIG. 7 schematically illustrates a general endpoint computer system according to the invention.

General computing infrastructure to which the invention is providing an improvement to consists of a computer 101 or computers connected by a network link 102 to a central, or common storage 103, as shown in FIG. 1. Computer 101 is preferably a general computer system 20 shown in FIG. 7. The computer system 20 has a number of physical and logical components, including a central processing unit ("CPU") 24, random access memory ("RAM") 28, an input/output ("I/O") interface 32, a network interface 36, non-volatile storage 40, and a local bus 44 enabling the CPU 24 to communicate with the other components. The CPU 24 executes an operating system and a number of software systems. RAM 28 provides relatively-responsive volatile storage to the CPU 24. The I/O interface 32 allows for input to be received from one or more devices, such as a keyboard, a mouse, etc., and outputs information to output devices, such as a display and/or speakers. The network interface 36 permits communication with other systems, including the storage device 103 of FIG. 1. Non-volatile storage 40 stores the operating system and programs. During operation of the computer system 20, the operating system, the programs and the data may be retrieved from the non-volatile storage 40 and placed in RAM 28 to facilitate execution.

Figure 2:
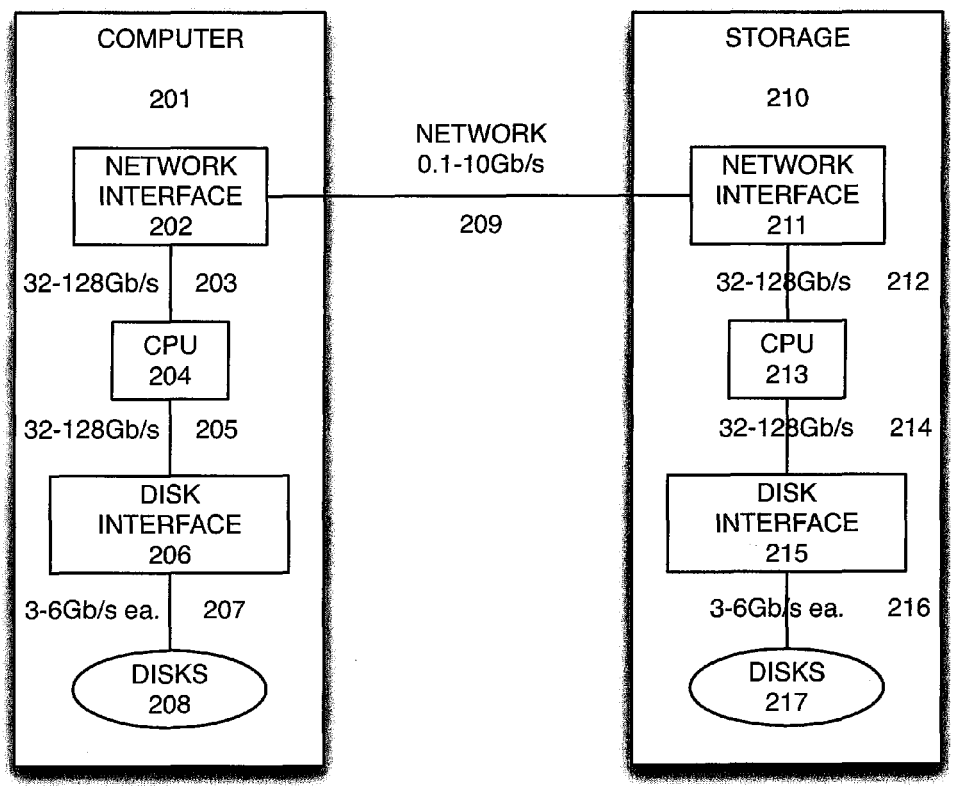
FIG. 2 schematically shows data transfer rates of the system of FIG. 1.

Referring now to FIG. 2, there is shown a schematic of a computer system 201 in network 209 communication with a central storage 210. The computer system therein includes a network interface 202 in communication contact via communications link 203 with a CPU 204 which is communication contact via communications link 205 with a disk interface that communicates via link 208 with the local computer storage disks. The communications links 203, 205 and 207 are generally known in the art as the communication means between the respective elements of the computer system 203. As illustrated, the data transfer rates between respective elements can vary, for example between 32 to 128 gigabits per second between network interface 202 and CPU 204, between 32 to 128 gigabits per second between CPU 204 and disk interface 206 and between 3 to 6 gigabits per second between the disk interface 206 and the disk(s) 208. Storage device 210, which may itself be a computer system includes correspondingly operating network interface 211, CPU 213, disk interface 215 and disks 217 connected via communications links 212, 214 and 216, respectively. Network 209 is present between the computer system 201 and the central storage 210. Network communications are currently limited, due to physical and software constraints to between 0.1 to 10 gigabits per second. As will be evident, within the computer system 201 and the storage system 210, there is a hierarchy of performance capabilities starting with very high performance closer to the CPU and relatively low performance further away from the CPU. The slowest connection, in general, is however the network connection between the computer and the storage system.

Within a multi-computer network there is also a hierarchy of performance due to sharing infrastructure that supports multiple data flows between different computers and central storage. In this context, and for the purpose of the application, an endpoint is defined as each computer system that is the ultimate recipient of data from a central storage. The invention relates to improving upon the delivery of data to these endpoints given the inherent limitations of the network infrastructure in transferring data from a central storage to an endpoint computer system.

Figure 3:
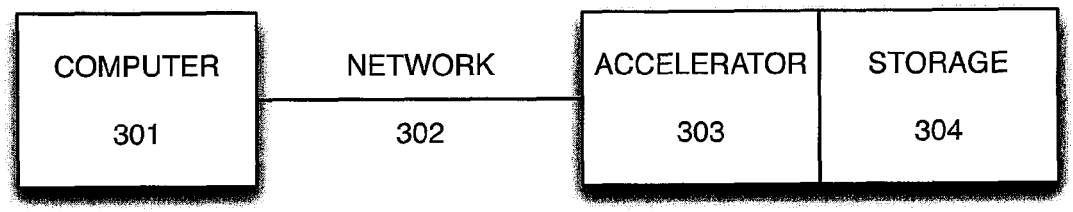
FIG. 3 shows an arrangement of a prior art storage accelerator applied to the system of FIG. 1.

FIG. 3 shows one prior art solution that has attempted to improve the efficiency of data transfer by placing an accelerator 303 between the network 302 and the storage 304, and arranging for the network performance at the storage 304 to match the performance of the storage 304, prior to the data entering the network 302 for transfer to the computer system 301. When the accelerator 303 is a type of caching or tiering module, it may be referred to as a Tier 0 storage layer, where the storage system itself includes pre-existing storage layers Tier 1, Tier 2 . . . . Tier n.

Figure 4:
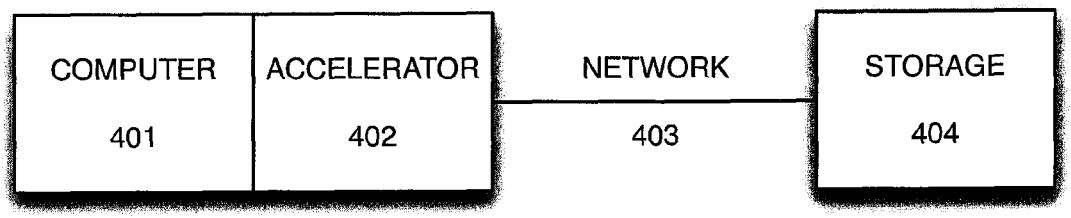
FIG. 4 schematically shows one embodiment of a system according to the invention.

As shown in FIG. 4, according to the invention, the Tier 0 storage layer on the accelerator 402 is moved from being on the far end of the network relative to the computer system 401, to being local to the computer system 401 where the performance between the CPU of the computer system 401 and the Tier 0 storage on the accelerator 402 can be much higher than the prior art solution of FIG. 3. Accordingly, the term endpoint caching is used since the Tier 0 is at an endpoint of the storage flow instead of in the middle between the computer and Tier 1 (or Tier N) where the data is actually persisted. Furthermore, in the disclosure, the terms caching and tiering are used generally interchangeably because caching is a special subset of tiering where the decision to move the data to the next tier is "as soon as possible" instead of other tiering policies such as "if necessary", and a particular Tier N can be considered a cache in that the data on that tier would otherwise (or additionally, depending on the type of tiering) exist on some Tier M (M>N).

The invention herein described differs from prior art solutions, as will become evident in view of the description below, in that (a) the invention is based on file access and because access context is available it can therefore support a fine-grained matching policy to allow the Endpoint Cache to selectively cache data and therefore be more efficient than other solutions that are less discriminating; (b) the invention is based on file access and therefore can choose whether to operate in data chunks that are all the same (as block based systems do), or vary according to file contents (context sensitive), or vary according to application requests, or work in more than one way depending on context; (c) the invention is completely transparent to end-users for existing filesystems; and, (d) the invention is agnostic and does not require modifications to filesystem implementations in order to operate.

Specifically, the Endpoint Caching according to the invention differs from the known "buffer cache" that most computer systems maintain in RAM because (a) data in the endpoint cache of the invention is maintained, independently of the CPU and contrary to the volatile nature of a buffer cache, at the local Tier 0 level until a cache maintenance process cleans it (flushes newly written data to Tier 1) and removes it; and, (b) the endpoint cache may use foresight (pre-emptive caching or prefetch based on internal or external knowledge) as opposed to a statistically based predictive approach which current buffer caches employ (e.g. read-ahead, or branch prediction).

The Endpoint Caching according to the invention differs from prior caching network filesystems because (a) the invention is agnostic to the remote storage system (for example as is not the case with Sun Microsystems™ CacheFS); (b) the invention is agnostic to the protocol used with the remote storage system (for example as is not the case with solutions known as Coda and Intermezzo); and, (c) the invention is transparent to how the computer usually uses the storage (many systems such as TsumuFS or xCachefs are independent of the type of remote storage system but are not transparent because they require mounting the remote storage in a specialized manner).

Various non-limiting examples of putting the invention into practice will now be described. While the descriptions below are provided with respect to a single endpoint cache on a single computer in communication with the network, the invention is equally applicable to any number of computers accessing the network. Furthermore, it is contemplated that more than one computer system may form a single endpoint, and therefore, one endpoint cache may be provided for one or more computers arranged as an endpoint in the overall system.

Figure 5:
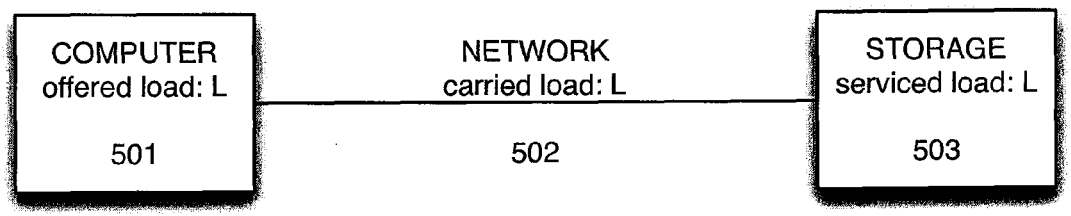
FIG. 5 illustrates the load carried by the network of the system of FIG. 3.
Figure 6:
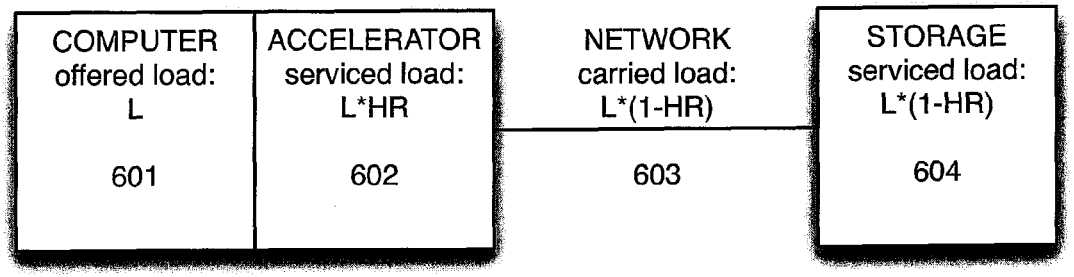
FIG. 6 illustrates the load carried by the network of the system of FIG. 4.

In order to practice Endpoint Caching the computer system at an endpoint is programmed to transparently access a local Tier 0 without the remote storage being aware of any change. As the Tier 0 is a cache, by its nature the performance requirements of the network between the computer and the remote storage (towards Tier 1) is decreased because time-correlated and prefetched I/O is preferentially serviced from the local Tier 0 cache and therefore less network traffic (and consequently network performance, both individually for each endpoint and in aggregate for the network infrastructure) is necessary for the Tier 0 cache to update the Tier 1 storage layer than if the computer was directly accessing a remote Tier 0 or Tier 1. That is, the Tier 0 cache implemented by way of an endpoint accelerator take some amount of load off the network, and is also able to communicate with the CPU of an endpoint computer system. This distinction is illustrated in FIGS. 5 and 6. FIG. 5 shows the prior art system, where a computer system 501 has an offered load L, which is carried by the network 502 in its entirety and serviced at central storage 503 as load L as well. FIG. 6 illustrates an embodiment of the invention where a computer system 601 has an offered load L. The tier 0 cache implemented on accelerator 602 takes a portion of the load HR, where HR is greater than 0 and less than 1. Accordingly, the network 603 has a load of L(1−HR), which is also the load serviced by the central storage 604. Similarly the performance requirements of the Tier 1 storage layer on the central storage 604 is decreased because it now has to service average load requirements as presented through a cache, instead of direct peak load requirements, generated by the computer in the absence of any Tier 0 storage layer.

Figure 8:
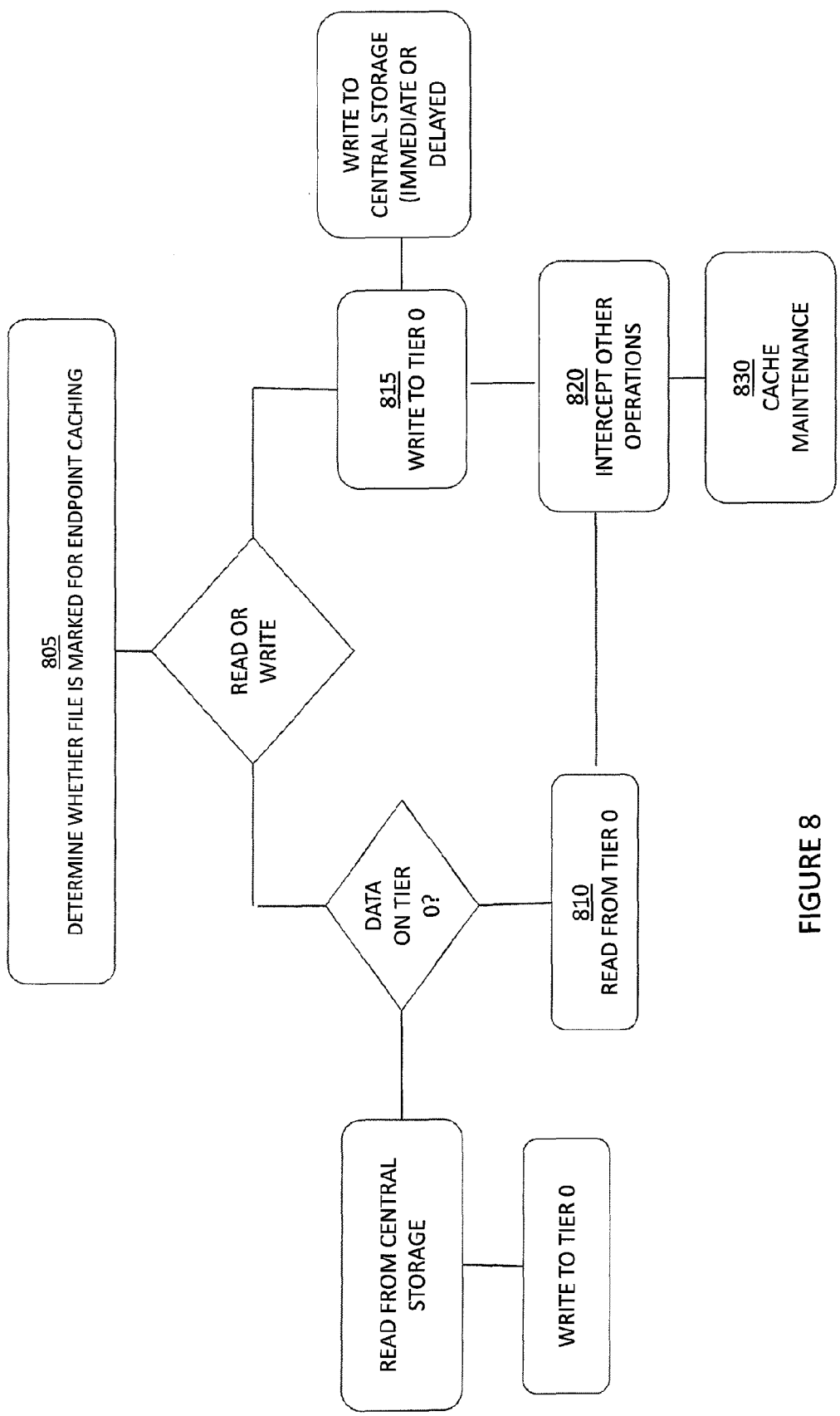
FIG. 8 is a flowchart showing one embodiment of a method according to the invention.

Thus, the invention provides a technical solution resulting in an economic efficiency of computing infrastructure In implementing the invention on a Windows™ operating system, and with reference to FIG. 8, one implementation of the invention includes creating a filter driver and positioning the filter driver in a filter stack, where it is in the communication path of all filesystem input/output operations. The filter driver is programmed and otherwise adapted to carry out the method according to this implementation of the invention that includes the step 805 of determining whether a file is marked for Endpoint Caching. This may be done by matching the context of the file with configured context patters and policies to determine whether the file contains header or other descriptor information indicating that it is earmarked for Endpoint Caching. This is preferably carried out when each file is opened. In step 810, if the file descriptor indicates that the file is marked for Endpoint Caching, and the filter driver sees a read operation, then the requested data is checked to see if it already exists in the Tier 0 cache on the accelerator and if so, then the read is fulfilled from the Tier 0 cache. If the requested data is not found on the Tier 0 cache then the data is retrieved from the source location (ie. the central storage) to fulfill the read. The tier 0 cache also receives and stores a copy of the data. Alternatively, if the filter driver sees a write operation, then in step 815, the Tier 0 cache is updated with the new data to be written, and also immediately written to the source location at the central storage. Alternatively, a delayed write operation is also possible, where the Tier 0 cache is immediately written with the new data and an action is queued to write the data to the central storage. This permits the load on the network to be monitored and controlled so that higher priority data can be given priority in being transferred over the network.

In step 820, other operations are intercepted, as needed, to maintain consistency in the data. For example, changing the source filesystem should map onto corresponding changes in the Tier 0 cache or if the cache is keyed by the filename then appropriate rename operations are processed at this step. Other examples include file delete operations are intercepted and processed at this step, file attribute changes, etc.

In step 830, a cache maintenance function or module is provided to free up space on the Tier 0 cache as necessary when the Tier 0 cache fills. The data purged from the Tier 0 cache during the process of freeing up space may be based on policies programmed into the cache maintenance function. For example, any one of the oldest data, the least accessed data, the lowest priority data (for example, user files vs. system files as defined), or any other data policies that may be determined depending on particular implementations of the invention.

In step 840, a source file access mechanism is provided using a cooperating process, whether inside or outside of the operating system kernel to enable appropriate access to source files. For remote source files, this ability would be provided outside of the kernel. Source files may exist on the Tier 0 cache or on the central storage as described above, but through this mechanism, the CPU will always route communication processes of files marked for endpoint caching through the Tier 0 cache.

The implementation of the invention described above uses known caching technology and processes, but applies them in a novel and non-obvious manner. For example, methods and processes for the CPU to communicate with the accelerator and Tier 0 storage are not described in detail. Furthermore, while these processes and caching technologies of putting the invention into practice may be known, the results of significantly reduced load on a network, transparency of the Tier 0 cache to the endpoint CPU and to the network, and total agnosticity to the central storage and/or to the endpoint computer system itself, are novel. The arrangement of elements in accordance with the invention produces an overall more efficient computer/network/storage system.

The configured context patterns in steps 805 and 810 may be rudimentary and cache all data in the Tier 0 cache, or may be sophisticated and specific whereby only certain types of files, identified for example by filename patters, an active user, an active application or other relevant policies are cached in the Tier 0 cache. Such context patterns are used to control the flow of data when the invention is active, allowing for fine control and therefore more efficient use of the Tier 0 cache. Furthermore, while caching in general is known in the art, as is the use of storage accelerators as was illustrated in FIG. 2, applicant believes that the use of an accelerator performing the function of a Tier 0 cache as herein described is novel, non-obvious and produces surprising results as herein articulated that have previous been unknown in the art.

Various other ways of implementing the invention, or various steps thereof, are contemplated, particularly when the Endpoint Caching is in communication with local (to the endpoint) fast storage. For example, a filesystem extension such as that described in co-pending PCT International Application number PCT/CA2011/050514 filed Aug. 24, 2011 by Zachariassen et al., the contents of which are herein incorporated by reference. Such a filesystem extension mechanism is able to extend the filesystem on the local storage to be able to place data on the storage medium of the Tier 0 cache, independently of the particular filesystem used on the local storage. Thus, the Tier 0 cache on the accelerator of the invention may appear to be part of the local filesystem to the computer system on which it operates and communications between the Tier 0 cache and the local storage will be completely transparent.

It is also contemplated that an existing filesystem may be modified to intrinsically provide the functionality of the Tier 0 cache. This can be accomplished in a manner similar to that described with respect to the filter driver above, but is put into practice by extending filesystem functionality without a filter driver. It should be noted that where the filesystem functionality is extended to put the invention into practice, the Tier 0 cache operates distinctly and differently from a typical local computer cache, where the data being cached is that which is intended for read/write operations on a far side of a network and a central storage unit. This operation is different from local computer caches which generally serve to cache data intended for quicker access by the RAM of the computer system. In one variation, a stackable filesystem using operating system facilities available for the purpose that layers the Tier 0 cache functionality on top of an existing filesystem may be provided. A standalone filesystem which is non-cooperatively stacked on top of an existing filesystem may also be used.

In environments where latency minimization is important, it is contemplated that the invention may be implemented in such a manner so as to minimize the required use of the operating system kernel. This may be done by providing a portion of the storage acceleration functions in a manner such that they are associated with each application and a portion implemented in hardware (or virtual hardware) on which the application is running. To accomplish this, the I/O operations performed by a particular application must be intercepted before they enter the kernel and when a file or I/O is marked for Endpoint Caching redirect the I/O operation to a software module that passes directly through or around the kernel, for example: direct block access (through), or memory mapped access (around). These access methods require the underlying storage acceleration device to provide a protocol API (as opposed to a programmatic API) that in cooperation with the portion associated with each application provide the full Tier 0 and storage acceleration functionality of the invention, as herein described. This may still be transparent to the application as the method used for intercepting I/O operations at the user level can be provided in a transparent manner. One such method involves redirecting (through an added kernel assist) the dynamically loaded system call library used by every application to a version that implements the interception, policy, and cooperative functionality required by the invention. An implementation as contemplated that circumvents the kernel using a memory mapping interface will avoid all the resources and time involved in context switching, kernel IO management, filesystem processing,—filters, and the device driver stack for every I/O operation to thereby mitigate the impact of latency.

It is further contemplated that the operating system buffer caching mechanism may be modified to use local fast storage in addition to available RAM on where the Tier 0 cache may be provided.

In one variation, the remote storage driver, such as NFS or CIFS, or a remote block device driver can be modified to apply the policy routing of data through the Tier 0 cache as described above. Such modifications will become apparent to a person skilled in the art in view of the description herein.

A logical volume driver may also be created or modified to create a virtual block device from real block devices to provide a Tier 0 cache as herein described. The facilities already built into filesystems may be used to supplement this by caching files locally on the computer system. A filesystem or filter driver cooperating with a block storage driver to provide context information to a block based caching system may also be used.

Alternatively, the remote central storage system may also maintain control or information about the local Tier 0 cache storage if the storage protocol allows such referencing. In this embodiment, some control over the Tier 0 cache will be held with the central storage, however, the responsibility for maintaining policy or contextual rules as described above is preferably maintained at the endpoint CPU.

Applicant is not aware of any prior art that provide Endpoint Caching functionality transparently for existing files. Common remote filesystems such as NFS or CIFS do not use local persisting caching of a central storage, and further do not include the capabilities or suggestions to implement the invention herein described. Some filesystem interfaces to cloud storage services (or object stores) use persistent local caching (e.g. Dropbox™) however, they present as independent filesystems or special synchronized directories as opposed to working transparently with existing files. The ability to work transparently with existing files is provided exclusively by the Tier 0 cache of a remote central storage having Tiers 1 to N (N>=1) of the remote storage, downstream in the network from the remote storage itself and in communication with an endpoint CPU.

Although the preferred embodiment is in a particular context of the Windows operating system, the same general method is also applicable in other contexts including other operating system environments such as Linux, other Unices, and of course in the context of mobile systems that may not expose traditional file systems to end users.

In some variations of the invention, the remote storage system may be shared, as may be the case with remote filesystem protocols but typically not with block devices. In this variation, the Endpoint Caching function is adapted to ensure cache consistency among multiple independent clients. The remote filesystem protocol would normally provide for this situation as it needs to ensure consistency among its clients. This is the case where the remote central storage is made of a plurality of remote storage devices, or in the alternative, where a number of endpoint computer systems are writing data to the remote storage, where this data is itself shared among two or more endpoint computer systems. The concept of a lease, or a revocable lock, on data is commonly used to ensure such consistency, and the Endpoint Caching accelerator or the Tier 0 must cooperate with protocol messages that revoke exclusive access to data by appropriately flushing (i.e. completely clearing or writing) data to maintain cache semantics. In a preferred embodiment, the process that provides access to source files arranges to be informed of such revocations so that appropriate action can be taken.

One additional advantage of the invention arises when the remote storage system in unavailable, or otherwise disconnected from the network. In this circumstance, configurable policy controls may be implemented to control the behavior of the Endpoint Cache. The default behavior may be, for example, that read operations are fulfilled from the Tier 0 cache if possible and will otherwise fail, while write operations will be filled on the Tier 0 cache and queued for later writing to the central storage. A subsequent conflict resolution may be required in the case of simultaneous conflicting writes from another system.

In one variation of the invention, the effective I/O buffering policy used by applications may be transparently changed. Applications on modern operating systems can generally choose between buffered I/O and unbuffered I/O. Buffered I/O means that the I/O operations requested by the application goes through a cache manager in the operating system kernel which for reads will look up the requested data in the kernel buffer cache, and for writes will write the provided data into the kernel buffer cache, and the kernel is in charge of updating the real target of the I/O (somewhere on primary storage). Unbuffered I/O means that the I/O operations requested by the application do not go through a cache manager as described above, but instead in real time read data from, or respectively write data to, the target of the I/O on primary storage. There are variations on this to ensure the data is actually written to the physical location representing the data before success is reported back to the application, instead of just being queued for writing to the physical location. In this variation, the invention includes modifying the effective operating system buffering policy of data being requested by an application for read and/or write I/O operations by actively supplying data to or removing data from an operating system buffer; enabling or disabling the operating system buffer cache as required for said I/O operations; wherein said step of supplying data to the operating system buffer cache includes arranging for the application to use said data cached by the operating system.

The invention may be applied to this scenario by controlling the buffering of each I/O type independently. For example, reads could be buffered while writes could be unbuffered. As an example, a database which normally operates with unbuffered I/O operations could in reality perform buffered reads and unbuffered writes with no change in operational semantics. In order to control the buffering of I/O operations externally from and transparently to the application requesting the I/O, one simple method is to control the buffering of the data in the Tier 0 cache storage which is fully under the control of the storage accelerator functionality of the invention. This can be done by an intercepting caching module as described in co-pending PCT International Application number PCT/CA2011/050515 to Zachariassen et al., filed on Aug. 24, 2011, the contents of which are herein incorporated by reference, that can be set by external policy to behave this way. The intercepting caching module of the aforementioned PCT application would thus be able to control application caching in three ways: by intercepting the file opening parameters from the application which may request a particular kind of buffering and change them appropriately, and/or by changing the buffering of the data kept on the Tier 0 cache, and/or by intercepting queries to and requests for the operating system cache manager. In this way Endpoint Caching can provide a multi-level cache within the endpoint computer system for I/O that without the invention would have to traverse a network to remote storage.

The above-described embodiments are intended to be examples of the present invention and alterations and modifications may be effected thereto, by those of skill in the art, without departing from the scope of the invention that is defined solely by the claims appended hereto.

What is claimed is:

1. A data storage system comprising:
   a central storage system including a tiered data structure having tiers 1 to N (N>=1);
   at least one endpoint computer system in network communication with the central storage system via a network infrastructure;
   a storage accelerator in communication with a processor of the at least one endpoint computer system, wherein the storage accelerator comprises a cache functioning as a tier 0 relative to tiers 1 to N (N>=1) of the tiered data structure of the central storage system; and
   a filter driver in communication with the storage accelerator including a software driver and instructions for determining whether a file being read or written has been marked for endpoint caching, wherein the storage accelerator provides endpoint caching of data on the central storage system accessible to the at least one endpoint computer system via the network infrastructure, wherein:
   the filter driver transparently changes an effective buffering policy of data as requested by the application independently or in combination with read and write I/O operations, and
   the storage accelerator executes, by the processor, computer readable instructions for controlling a physical storage unit attached to a bus or other high-speed network in communication with the at least one endpoint computer system.

2. A data storage system according to claim 1, wherein the physical storage unit comprises a solid-state memory device.

3. A data storage system according to claim 2, wherein the storage accelerator comprises a data caching structure.

4. A data storage system according to any one of claim 1, wherein the instructions for determining whether a file being read or written has been marked for endpoint caching include instructions for accessing file metadata information.

5. A data storage system according to claim 4, wherein the filter driver further includes instructions for determining if a data read operation is being requested by the at least one endpoint computer system, and if so, determining whether data being read already exists on the storage accelerator and (a) if so, fulfilling the data read operation from the storage accelerator; (b) if not, requesting the data from the central storage system and providing a copy of the data to the storage accelerator.

6. A data storage system according to claim 5, wherein the filter driver further includes instructions for:
   determining if a data write operation is being requested by the at least one endpoint computer system; and
   writing the requested data for the data write operation to the storage accelerator.

7. A data storage system according to claim 6, wherein the filter driver further includes instructions for writing the requested data to the central storage system.

8. A data storage system according to claim 6, wherein the filter driver further includes instructions for queuing the data to be written to the central storage system.

9. A data storage system according to claim 6, wherein the filter driver further includes instructions for maintaining consistency of data between the central storage system and the storage accelerator.

10. A computer-implemented data storage method comprising:
   determining whether a file being read or written from or to a central storage system has been marked for caching at a storage accelerator at an endpoint computer system, wherein the storage accelerator is in communication with a filter driver including a software driver and instructions for determining whether a file being read or written has been marked for endpoint caching;
   determining if a data read operation is being requested and if so, determining whether data being read exists on the storage accelerator and (a) if so, fulfilling the data read operation from the storage accelerator (b) if not, requesting the data from the central storage system and providing a copy of the data to the storage accelerator;
   determining if a data write operation is being requested by the computer system and if so, writing the data to the storage accelerator; and
   transparently changing an effective buffering policy of data as requested by the application independently or in combination for read and write I/O operations, wherein the central storage system comprises a tiered data structure having tiers 1 to N (N>=1), wherein the storage accelerator comprises a cache functioning as a tier 0 relative to tiers 1 to N (N>=1) of the tiered data structure of the central storage system.

11. A data storage method according to claim 10, further comprising maintaining consistency of data between the central storage system and the storage accelerator.

12. At least one computer readable storage medium including instructions that, when executed on a machine, cause the machine to carry out the method according to claim 10.

* * * * *